United States Patent [19]

Kaneko

[11] Patent Number: 4,858,845
[45] Date of Patent: Aug. 22, 1989

[54] APPARATUS FOR FOLDING FISHING REEL HANDLE

[75] Inventor: Kyoichi Kaneko, Tokyo, Japan

[73] Assignee: Daiwa Seiko Inc., Higashikurume, Japan

[21] Appl. No.: 244,686

[22] Filed: Sep. 15, 1988

[30] Foreign Application Priority Data

Oct. 9, 1987 [JP] Japan .................................. 62-254942
Oct. 9, 1987 [JP] Japan .................................. 62-254943

[51] Int. Cl.$^4$ ............................................ A01K 89/00
[52] U.S. Cl. ........................................ 242/285; 74/547
[58] Field of Search ...................... 242/84.1 J; 74/547, 74/548

[56] References Cited

U.S. PATENT DOCUMENTS

| | | | |
|---|---|---|---|
| 2,572,444 | 10/1951 | Carden | 74/547 X |
| 4,253,618 | 3/1981 | Beraut | 242/84.1 J |
| 4,310,127 | 1/1982 | Yamasaki | 242/84.1 J |
| 4,437,621 | 3/1984 | Sakumoto | 242/84.1 J |
| 4,524,921 | 6/1985 | Ozaki | 242/84.1 J |
| 4,588,141 | 5/1986 | Uetsuki | 242/84.1 J |

FOREIGN PATENT DOCUMENTS 60-12972 1/1985 Japan .
62-10620 1/1987 Japan .

Primary Examiner—Stuart S. Levy
Assistant Examiner—Katherine Matecki
Attorney, Agent, or Firm—Browdy and Neimark

[57] ABSTRACT

The handle folding apparatus for fishing reels according to this invention allows the folding of the handle arm and also the secure coupling of the handle arm to the handle shaft of the spinning reel. A handle stopper is slidably installed between the bottom of the fork of the handle seat and the front end of the handle arm. The handle stopper has an engagement projection which is in contact with the engagement surface formed at the end of the handle arm, in order to produce a wedge effect to securely hold the handle arm without a play when in use or easily allow the handle arm to be folded when not in use. The handle stopper, which is slidably installed but not mounted with a pin as in the conventional apparatus, reliably eliminates plays between the handle arm and the handle shaft of the spinning reel and at the same time makes the handle folding mechanism comact and lightweight.

7 Claims, 5 Drawing Sheets 4,858,845

APPARATUS FOR FOLDING FISHING REEL HANDLE

FIELD OF THE INVENTION

This invention relates to an apparatus that compactly folds the handle of fishing spinning reels.

BACKGROUND OF THE INVENTION

In conventional spinning reels, an apparatus for folding the handle arm sideways without a play, as disclosed in the Japanese Patent Publication No. 10620/1987 and the Japanese Utility Model Laid-Open No. 12972/1985 has the drawback that since the handle stopper is rotatably operated supported on a pin, a large space for rotation is needed, making the handle large and the assembly difficult.

SUMMARY OF THE INVENTION

In light of the above disadvantage, it is a primary object of the present invention to provide a handle folding apparatus for fishing reels in which a handle stopper is slidably installed in a gap between the bottom of a fork formed on the handle seat and the front end of the handle arm or between the bottom of a fork formed at the front end of the handle arm and the front end of the handle seat in order to eliminate any play of the handle arm and reduce the operation space of the handle stopper, making the handle folding mechanism light weight and compact, allowing the handle stopper to be easily installed without using a pin to facilitate the manufacture and assembly process.

Another object of the invention is to provide a handle folding apparatus for fishing reels in which a handle stopper for coupling the handle arm to the handle seat for mounting or for retaining the handle arm for folding is slidably installed between the bottom of a fork of the handle seat and the front end of the handle arm rotatably mounted to the fork or between the bottom of a fork of the handle arm and the front end of the handle seat to which the fork is rotatably mounted; and in which an engagement projection of the handle stopper is in contact with a recessed engagement surface of the handle arm or handle seat to provide a wedge action to firmly hold the handle arm, so that the space in which the handle stopper slides can be made very small, making the handle folding mechanism small and lightweight.

A still another object of the invention is to provide a handle folding apparatus for fishing reels in which the handle stopper can be held at the bottom of the fork of the handle seat or handle arm without having to use a pivotable pin as required by conventional folding apparatuses; in which the manufacture and assembly is very simple; and in which the handle stopper can reliably eliminate any play between the handle stopper and the handle seat, making the rotation of the handle smooth.

A further object of the invention is to provide a handle folding apparatus for fishing reels in which a second engagement projection and a second engagement surface are formed at the sliding portions of the handle stopper and the handle arm's front end or at the sliding portion of the handle stopper and the handle seat's front end to provide a wedge effect and securely couple the handle arm to the handle seat without a play even with a small sliding movement of the handle stopper, realizing further reduction in size of the handle folding mechanism for better portability and operation.

A still further object of the invention is to provide a handle folding apparatus for fishing reels in which the handle stopper is formed with a projection in a spring accommodating recess—the spring being adapted to urge the operating portion of the handle stopper to project outwardly—which is engaged with the engagement portion of the spring to prevent the handle stopper from protruding and the handle arm from being folded inadvertently during use due to wear of the engagement projection and the engagement surface which are in wedge contact or due to bad dimensional accuracy during manufacture.

DETAILED DESCRIPTION OF THE INVENTION

Figure 1:
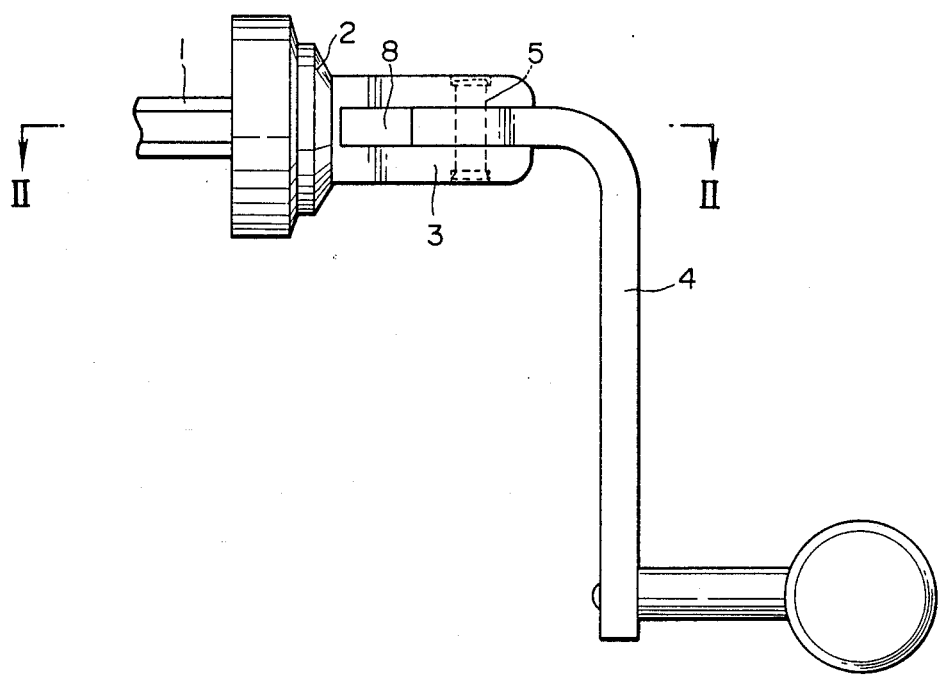
FIG. 1 is a plan view of an apparatus according to the invention.

The detail of the invention will now be explained by referring to the attached drawings showing the embodiments of the invention. A handle shaft 1 of the spinning reel has a handle seat 2 at the end, on which a fork is formed 3 consisting of two plates. A bent front end of a handle arm 4 on the fork 3 is rotatably supported through a shaft 5 with a space between it and the bottom of the fork 3.

Between the bottom of the fork 3 of the handle seat 2 and the front end of the handle arm 4 is slidably installed a handle stopper 8 which is slightly inclined in the gap between the fork plates and which has an operating portion 6 at one end and an engagement projection 7 at the other end that projects toward the handle arm 4. The engagement projection 7 is in contact with an engagement surface 10 of a recess 9 formed at one side of the front end of the handle arm 4. The wedge action of the engagement projection 7 and the engagement surface 10 urges the handle arm 4 to rotate clockwise in FIG. 2 about the shaft 5. A spring 13 is interposed between an engagement recess 1 formed at the bottom of the fork 3 of the handle seat 2 and an engagement recess 12 formed in the handle stopper 8 to urge the operating portion 6 of the handle stopper 8 to project outwardly.

Figure 2:
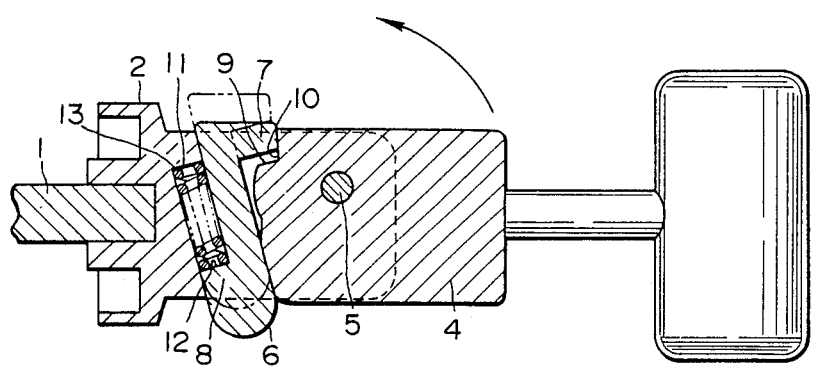
FIG. 2 is a vertical cross-sectional view of the apparatus taken along the line II—II of FIG. 1.
Figure 3:
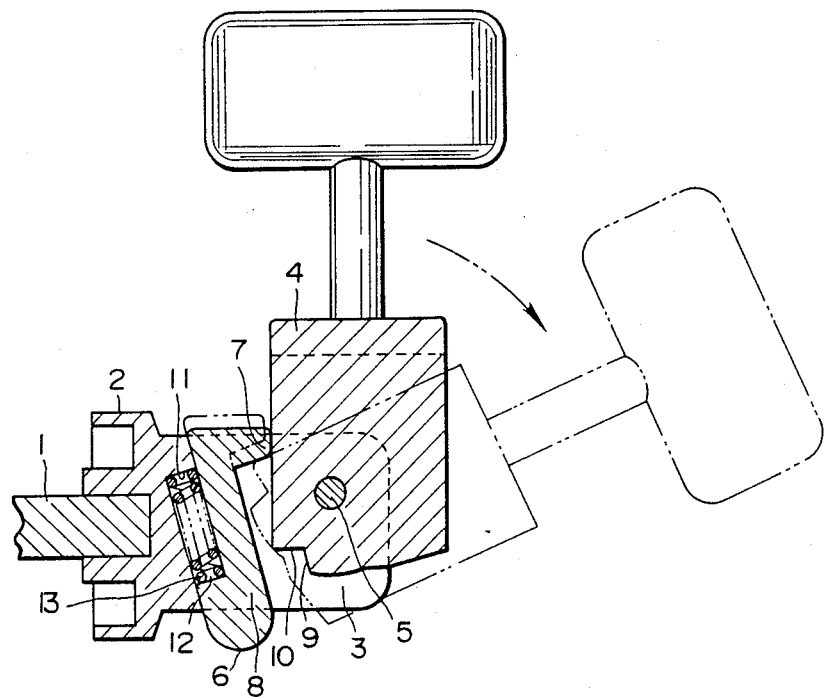
FIG. 3 is a vertical cross-sectional view showing the apparatus folded.

With the handle arm 4 mounted as in FIG. 2, as the operating portion 6 of the handle stopper 9 is pushed against the force of the spring 13 and the handle arm 4 is rotated counterclockwise in the direction of the arrow, the engagement projection 7 disengages from the engagement surface 10, allowing the handle arm 4 to be folded sideways as shown in FIG. 3.

To couple the handle arm 4 to the handle shaft 1, the handle arm 4 is rotated clockwise from a position in FIG. 3 in the direction of the chain-line arrow. The engagement surface 10 then comes into contact with the engagement projection 7 of the handle stopper 8, causing the handle arm 4 to be pushed and slightly turned clockwise about the shaft 5 by the wedge action between the engagement projection 7 and the engagement surface 10. As a result, the front end surface of the handle arm 4 on the side opposite to the recess 9 presses a portion near the upper part of the operating portion 6 of the handle stopper 8 against the bottom of the fork 3 of the handle seat 2, thereby securely holding the handle arm 4 on the handle seat 2 without play between the elements.

Since the handle stopper 8 is firmly held inclined at the bottom of the fork 3 of the handle seat 2, when the handle arm 4 is folded, the handle stopper 8 is prevented from being dislocated from the fork 3 by the wedge action between the engagement projection 7 and the handle arm 4.

Figure 4:
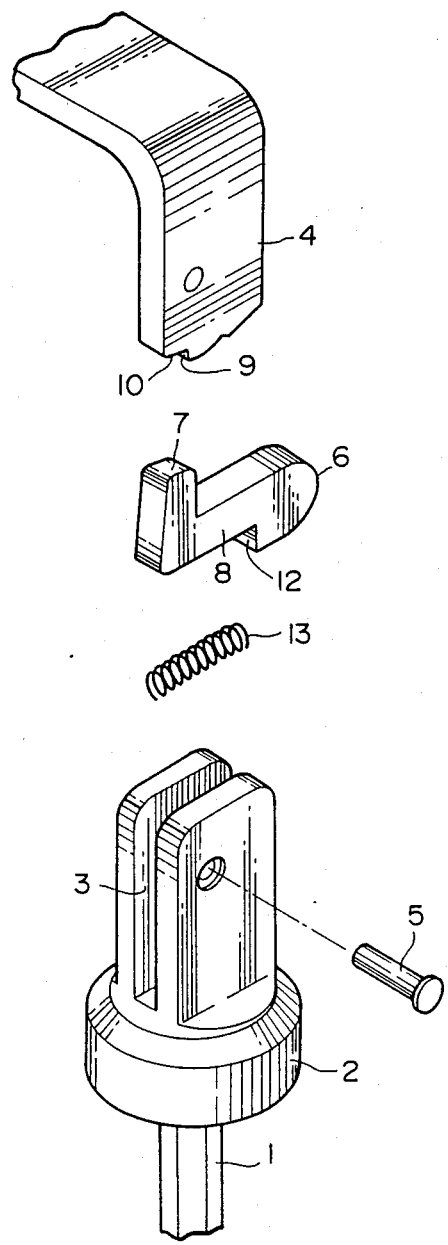
FIG. 4 is a perspective exploded view of the apparatus of the invention.

FIG. 4 shows a perspective exploded view of the apparatus according to the embodiment shown in FIGS. 1-3.

Figure 5:
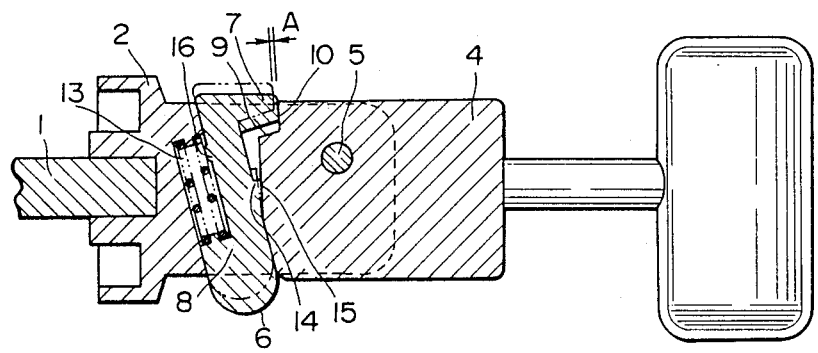
FIG. 5 is a vertical cross-sectional view of another embodiment of the invention.

FIG. 5 shows another embodiment, in which the handle stopper 8 has a second engagement projection 14 formed at the sliding part facing the handle arm 4 and in which the handle arm 4 is provided with a tapered second engagement surface 15 with which the second engagement projection 14 is in contact to provide a wedge effect. This structure provides a wedge effect in addition to the wedge action obtained by the engagement projection 7 and the engagement surface 10 to reduce the amount of displacement of the handle stopper 8 thus making the handle folding mechanism more compact. The handle stopper 8 also has, at the recess for accommodating the spring 13, a small projection 16 which is slightly smaller than a gap A that is formed between the engagement projection 7 of the handle stopper 8 and the engagement surface 10 of the handle arm 4 when the handle stopper 8 is pushed against the force of the spring 13. This small projection is another means to prevent the handle stopper 8 from projecting during reeling operation.

Figure 6:
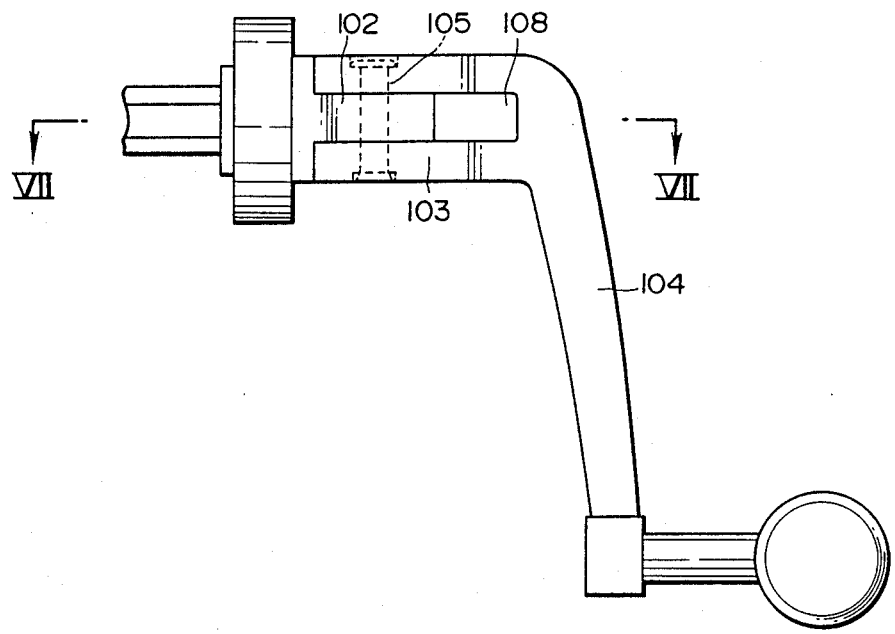
FIG. 6 is a plan view of still another embodiment of the invention.
Figure 7:
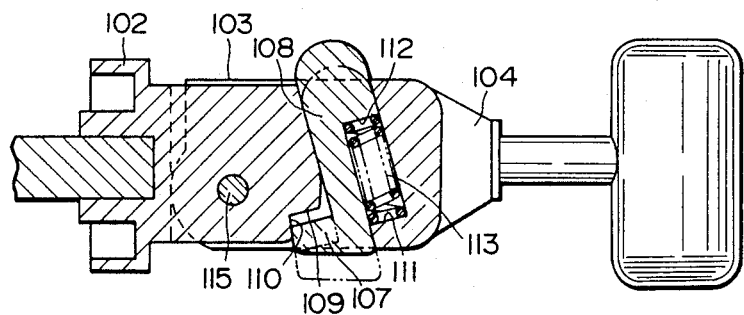
FIG. 7 is a vertical cross-sectional view taken along the line VII—VII of FIG. 6.
Figure 8:
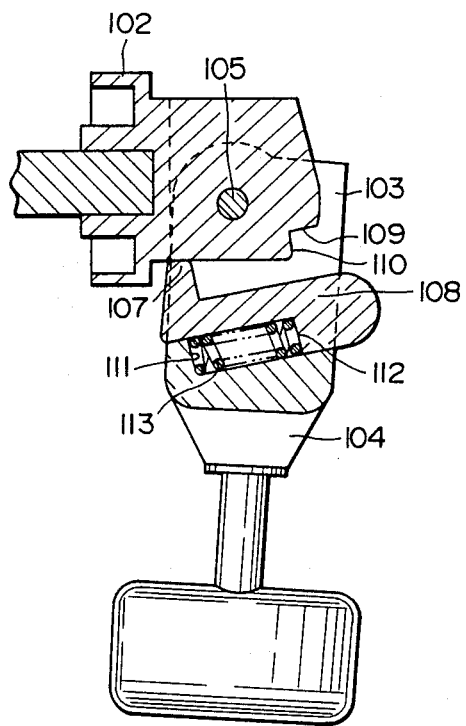
FIG. 8 is a vertical cross-sectional view of the folded apparatus of FIG. 7.

FIGS. 6 to 8 show a third embodiment of the invention, in which a fork 103 is formed at the bent front end of the handle arm 104. The fork 103 is rotatably mounted on the front end of a handle seat 102 through a shaft 105. The handle stopper 108 has an engagement projection 107 which is forced into contact with an engagement surface 110 of a recess 109 formed at the front end of the handle seat 102 to produce a wedge effect. A spring 113 is installed between a recess 111 formed in the handle arm 104 and a recess 112 of the handle stopper 108. When the handle arm 104 is folded, the handle stopper 108 is also folded together with the handle arm 104 as shown in FIG. 8.

Figure 9:
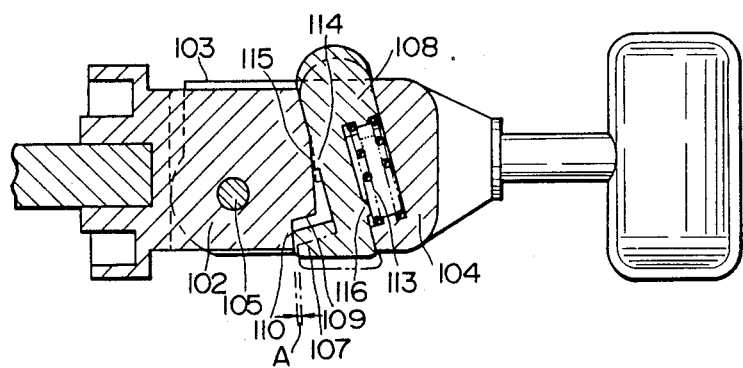
FIG. 9 is a vertical cross-sectional view of a further embodiment of the invention.

FIG. 9 shows a fourth embodiment of the invention. Like the second embodiment of FIG. 5, the handle stopper 108 has a second engagement projection 114 and the handle seat 102 is provided with a tapered second engagement surface 115 with which the second engagement projection 114 is in contact to provide a wedge effect. The handle stopper 108 also has a small projection 116 at the recess for accommodating the spring 113 to prevent the handle stopper from protruding.

We claim:

1. A handle folding apparatus for fishing spinning reels comprising:
   a handle seat provided at the outer end of the handle shaft;
   a fork consisting of two plates projecting outwardly from the handle seat;
   a handle arm having its bent front end rotatably supported between the forked plates and spaced from the bottom of the fork;
   a handle stopper slidably mounted between the front end of the handle arm and the bottom of the fork, the handle stopper having an operating portion at one end and an engagement projection at the other end projecting toward the handle arm;
   a recessed engagement surface formed at one side of the front end of the handle arm, the recessed engagement surface being adapted to come into contact with the engagement projection of the handle stopper to provide a wedge effect; and
   a spring compressed and installed between a recess formed at the bottom of the fork and a recess formed in the handle stopper on the handle shaft side near the operating portion to urge the operating portion of the handle stopper to project from the fork of the handle seat.

2. A handle folding apparatus for fishing spinning reels as set forth in claim 1, wherein a second engagement surface and a second engagement projection are formed at sliding portions of the bent front end of the handle arm and the handle stopper, the second engagement surface and the second engagement projection being adapted to come into contact with each other to provide an additional wedge effect.

3. A handle folding apparatus for fishing spinning reels as set forth in claim 1, wherein another engagement projection is formed on the handle stopper at the spring accommodating recess.

4. A handle folding apparatus for fishing spinning reels as set forth in claim 1, wherein said handle stopper is installed such that when the handle arm is in a locked position, a longitudinal axis of said handle stopper intersects a longitudinal axis of said handle arm.

5. A handle folding apparatus for fishing spinning reels comprising:
   a fork formed at the bent front end of a handle arm, the fork consisting of two plates;
   a handle seat having its front end rotatably supported between the forked plates and spaced from the bottom of the fork;
   a handle stopper slidably installed between the bottom of the fork and the front end of the handle seat, the handle stopper having an operating portion at one end and an engagement projection at the other end projecting toward the handle seat;
   a recessed engagement surface formed at one side of the front end of the handle seat, the recessed engagement surface being adapted to come into contact with the engagement projection to provide a wedge effect; and
   a spring compressed and installed between a recess formed in the handle stopper on the handle arm side near the operating portion and a recess formed at the bottom of the fork of the handle arm to urge the operating portion of the handle stopper to project from the fork.

6. A handle folding apparatus for fishing spinning reels as set forth in claim 5, wherein a second engagement surface and a second engagement projection are formed at sliding portions of the front end of the handle seat and the handle stopper, the second engagement surface and the second engagement projection being adapted to come into contact with each other to provide an additional wedge effect.

7. A handle folding apparatus for fishing spinning reels as set forth in claim 5, wherein said handle stopper is installed such that when the handle arm is in a locked position, a longitudinal axis of said handle stopper intersects a longitudinal axis of said handle arm.

* * * * *